US006375919B1

(12) United States Patent
Kakio et al.

(10) Patent No.: US 6,375,919 B1
(45) Date of Patent: Apr. 23, 2002

(54) METHOD FOR THE MANUFACTURE OF FERRIC SULFATE SOLUTION AND A WATER TREATMENT AGENT USING THE SAME

(75) Inventors: Toshihiko Kakio, Kobe; Tatsuo Tsukamoto, Kakogawa, both of (JP)

(73) Assignee: Taki Chemical Co., Ltd., Kakogawa (JP)

( * ) Notice: Subject to any disclaimer, the term of this patent is extended or adjusted under 35 U.S.C. 154(b) by 0 days.

(21) Appl. No.: 09/597,173

(22) Filed: Jun. 20, 2000

(30) Foreign Application Priority Data

Jul. 8, 1999 (JP) .......................... 11-194043
Jul. 8, 1999 (JP) .......................... 11-194044

(51) Int. Cl.⁷ .......................... C01G 49/14; C02F 1/00
(52) U.S. Cl. .................. 423/558; 423/146; 423/DIG. 2; 252/175; 210/716; 210/722
(58) Field of Search ................. 423/558, 146, 423/DIG. 2; 210/716, 722; 252/175

(56) References Cited

U.S. PATENT DOCUMENTS 4,507,273 A * 3/1985 Hudson ...................... 423/558
4,707,349 A   11/1987 Hjersted ...................... 423/558
5,766,566 A * 6/1998 Mattila et al. ............... 423/558

FOREIGN PATENT DOCUMENTS

| CN | 1032532 A | 4/1959 | |
| CN | 1049487 A | 2/1991 | |
| CN | 1052835 A | 7/1991 | |
| JP | 61-215222 A | 9/1986 | |
| JP | 61-286229 A | * 12/1986 | ................ 423/558 |
| JP | HEI 02/22012 B2 | 5/1990 | |
| JP | HEI 05/13094 B2 | 2/1993 | |
| JP | HEI 05/13095 B2 | 2/1993 | |
| JP | HEI 05/53730 B2 | 8/1993 | |
| JP | HEI 07/241404 A | 9/1995 | |
| JP | 2000-185921 A | 7/2000 | |
| JP | 2000-191328 A | 7/2000 | |
| SE | 451999 B | 11/1987 | |

OTHER PUBLICATIONS

English Translation of Chinese Patent No. CN1052835A to Zhang, Jul. 10, 1991.

* cited by examiner

Primary Examiner—Steven P. Griffin
Assistant Examiner—Timothy C. Vanoy
(74) Attorney, Agent, or Firm—Kolisch Hartwell Dickinson McCormack & Heuser

(57) ABSTRACT

A method for the manufacture of a ferric sulfate solution is provided, characterized in that, iron ore containing 30% by weight or more FeOOH as a trivalent iron ($Fe^{3+}$) is calcined at 200–600° C., and then dissolved in sulfuric acid. A water treatment agent consisting of a basic ferric sulfate solution manufactured by the above mentioned manufacturing method is used as a coagulating agent for water treatment.

2 Claims, No Drawings

METHOD FOR THE MANUFACTURE OF FERRIC SULFATE SOLUTION AND A WATER TREATMENT AGENT USING THE SAME

TECHNICAL FIELD OF THE INVENTION

The present invention relates to a method for the manufacture of a ferric sulfate solution and to a water treatment agent. More particularly, it relates to a method for the manufacture of a ferric sulfate solution which is characterized in dissolving an iron ore containing 30% by weight or more FeOOH as a trivalent iron ($Fe^{3+}$) in sulfuric acid and to the use of a water treatment agent consisting of the basic ferric sulfate solution manufactured by the said method as a coagulant.

PRIOR ART

Especially in recent years, a ferric sulfate solution has occupied the attention as a useful water treatment agent and, particularly, a ferric sulfate solution and a basic ferric sulfate solution have a quick sedimentation speed for the resulting flocs and show good deodorizing ability as compared with a water treatment agent of an aluminum type such as an aluminum sulfate solution and la basic aluminum chloride solution whereby they have been widely used as a water treatment agent for waste water from paper Manufacturing industry, from food industry, from chemical industry. etc. or as a dehydrating aid for sewage sludge. Usually, such a ferric sulfate solution and a basic ferric sulfate solution have been manufactured by dissolving ferrous sulfate in water, adding an appropriate amount of sulfuric acid thereto and being oxidized by air or by an oxidizing agent. In recent years however, ferrous sulfate obtained from washing of steel plate, etc. with acid or discharged and by-produced from titanium industry has been decreasing and the present situation is that a shortage in the material there for is resulted. It is also the present situation that a coagulation performance of the iron-based coagulants manufactured as such is not sufficient.

Under such circumstances, the present inventors have started in studying the manufacture of a ferric sulfate solution and, as a result of various investigations, they have found that iron ore containing 30% by weight or more FeOOH as a trivalent iron ($Fe^{3+}$) is very easily soluble in sulfuric acid and is able to manufacture a ferric sulfate solution at a low cost and have accomplished the present invention on the basis of such a finding.

Representative examples of iron ore are hematite, limonite and magnetite. Main component of hematite is $\alpha\text{-}Fe_2O_3$, that of limonite is $\alpha\text{-}FeOOH$ and that of magnetite is $Fe_3O_4$. Until now, various proposals have been made for a method of dissolving iron oxide or ferric hydroxide oxide which is a main component thereof. With regard to $\alpha\text{-}Fe_2O_3$, it has been said to be hardly soluble in sulfuric acid in general. With regard to $Fe_3O_4$, there is a disclosure, for example, in the Japanese Examined Patent Hei-02/22012 about a method of manufacturing a polyferric sulfate solution, i.e. a basic ferric sulfate solution, using 3 moles or more but less than 4 moles of sulfuric acid to 1 mole of ferrosoferric oxide ($Fe_3O_4$).

In the Japanese Examined Patent Hei-05/13095, there is a disclosure about a dissolving method for ferrosoferric oxide in which sulfuric acid having a concentration of 35–50% is used and a dissolution is carried out at the temperature of 75° C. or higher. In the Japanese Examined Patent Hei-05/13094, there is a disclosure about a dissolving method where ferrosoferric oxide, etc. and metal iron are dissolved at the temperature of 75° C. or higher using sulfuric acid of 40–45% concentration.

In the Japanese Examined Patent Hei-05/53730, there is a disclosure about a method for the manufacture of an iron sulfate solution in which from 3 moles to less than 10 moles (to 1 mole of ferrosoferric oxide) of sulfuric acid of 30–50% concentration and 0.1–0.5 equivalent (to $Fe_2O_3$ in ferrosoferric oxide) of a reducing agent are added to iron oxide mainly consisting of ferrosoferric oxide followed by dissolving at 75° C. or higher.

In the U.S. Pat. No. 4,707,349, there is a disclosure about a method in which iron ore containing an oxide of $Fe^{2+}$ and an oxide of $Fe^{3+}$, i.e. a ferrosoferric oxide ore, is dissolved in sulfuric acid.

In an iron sulfate solution manufactured by those methods, not only $Fe^{3+}$ but also $Fe^{2+}$ are contained in large quantities and, therefore, it is necessary to carry out an oxidation. Therefore, the cost for oxidation is needed and there is a disadvantage that a ferric sulfate solution cannot be manufactured at a low cost.

With regard to FeOOH, there is a disclosure, for example, in the Japanese Laid-Open Patent Hei-07/241404 that, in an iron-based coagulant in which iron oxide is dissolved in sulfuric acid followed, if necessary, by subjecting to .oxidation, ferric hydroxide oxide [FeOOH] produced from a ferric chloride solution is added to a trivalent iron material of the said iron oxide is used.

In this method however, a treatment for the manufacture of the material is necessary and, therefore, it is difficult to manufacture a ferric sulfate Solution at a low cost.

MATTERS TO BE SOLVED BY THE INVENTION

In view of the above, an object of the present invention is to provide a method for the manufacture of a ferric sulfate solution at low cost and in an industrially easy manner by dissolving the iron ore in sulfuric acid directly. Another object of the present invention is to provide an iron-based coagulant having a good coagulating property useful as a water treatment agent or, particularly, a basic ferric sulfate solution useful as a coagulant having a good coagulation performance.

MEANS FOR SOLVING THE MATTER

Thus, the first feature of the present invention relates to a method for the manufacture of a ferric sulfate solution, characterized in that, iron ore containing 30% by weight or more FeOOH as a trivalent iron ($Fe^{3+}$) is dissolved in sulfuric acid. Further, the second feature of the present invention relates to a method for the manufacture of a ferric sulfate solution according to the first feature wherein the said iron ore is that which is calcined at 200–600° C. Furthermore, the third feature of the present invention relates to an iron-based inorganic coagulant having a good coagulating property as a water treatment agent or, particularly, to a water treatment agent consisting of Et basic ferric sulfate solution.

BEST MODE FOR CARRYING OUT THE INVENTION

The ferric sulfate according to the present invention means that where the molar ratio of $SO_4/Fe$ is within a range of from 1.25 to 1.5, i.e. a solution of normal salt of ferric sulfate and a solution of basic ferric sulfate.

In the present invention, iron ore is dissolved using sulfuric acid and it is recommended to use the iron ore containing 30% by weight or more FeOOH as a trivalent iron ($Fe^{3+}$) When it is less than 30% by weight, amount of the residue after dissolving is large and the advantage of the present invention cannot be expected. Alternatively, it is desirable that the iron ore is ground using a commonly-used grinding machine such as a jaw crusher, a hammer mill or a ball mill. The smaller the particle size of the iron ore, the better the solubility. Generally, the particle size is preferably 500 μm or smaller or, more preferably, 300 μm or smaller.

Quite surprisingly, the present inventors have found that, when iron ore containing FeOOH is calcined, there is a further improvement in its solubility. The calcination temperature is 200–600° C. and, more preferably, 400–500° C. Although the reason why the solubility in sulfuric acid is improved by calcination is not clear, it is likely that FeOOH is dehydrated by calcination resulting in an increase in a specific surface area whereby the solubility is improved. According to the experiment by the present inventors, there is no improvement in the solubility when the temperature is lower than 200° C. Also, there is no improvement in the solubility when it is calcined at higher than 600° C. Although the reason therefor is not clear, it is presumed that FeOOH is changed to a stable $\alpha$-$Fe_2O_3$ whereby the solubility is not improved. With regard to the time for the calcination, one hour or shorter is sufficient. Even when calcination is carried out for longer than one hour, there will be no significant improvement in the solubility and, if the time is longer than one hour, a calcination furnace of a big scale is necessary in an industrial case whereby the cost for the calcination becomes high. Although there is no particular limitation for rising and lowering of the temperature, it is desirable to rise within about 30 minutes and to lower within about one hour.

With regard to sulfuric acid, concentration of the sulfuric acid used is preferably 30–50% by weight. When it is less than 30% by weight, long time is needed for dissolving the iron oxide while, when it is more than 50% by weight, solubility of the iron oxide usually becomes low depending upon the adding order of the materials, ratio of iron oxide to sulfuric acid used, dissolving temperature, etc.

With regard to the ratio of sulfuric acid used, it is adjusted so as to make the ratio of sulfuric acid to total iron within a range of $1.0 \leq SO_4/Fe \leq 1.5$. When the ratio is less than 1.0, solubility of iron oxide is not sufficient and economy is poor while, when it is more than 1.5, pH of the resulting ferric sulfate solution is low and its use is significantly restricted.

In the manufacturing method according to the present invention, the above-mentioned materials are poured into a reactor and the order of addition is that, at first, sulfuric acid of a predetermined concentration is poured into a reactor and then the ground iron ore is added. Incidentally, it is also possible to use concentrated sulfuric acid in the present invention. In that case, ground iron ore is added to water and then concentrated sulfuric acid is added thereto with stirring. When concentrated sulfuric acid is used, it is also possible to maintain the reaction temperature utilizing the exothermic reaction. Anyway, ratio of the materials is to be within the above-mentioned range. With regard to the reaction temperature, it is recommended to be 70° C. or higher and, more preferably, 90° C. or higher. The most preferred reaction temperature is about the boiling point. Of course it is also possible to use an autoclave.

Reaction time varies depending upon the molar ratio of sulfuric acid to iron, concentration of sulfuric acid and other reaction conditions and, although it is not decided readily, three hours is usually sufficient. When iron ore is well dissolved by the above method, the solution is cooled by allowing to stand, by means of water, etc. and then filtered by any filtering means such as a filter press or a centrifuge.

Iron sulfate can be easily manufactured by the method which is fully mentioned hereinabove. When, however, a small amount of ferrous iron is contained in the iron ore and that causes an inconvenience depending upon the type of use, the iron sulfate solution is subjected to an oxidizing step. Method for the oxidation may be carried out according to a known method and the oxidation can be easily conducted by an oxidizing agent such as hydrogen peroxide, manganese dioxide and sodium perchlorate.

When the finely ground iron ore is just dissolved in sulfuric acid directly by the above-mentioned method, a ferric sulfate solution can be manufactured quite easily and at a low cost.

Now, the water treatment agent of the present invention will be discussed. As mentioned already, coagulation performance of the conventional iron-based coagulants is not sufficient. However, it has now been found that, when a basic ferric sulfate solution manufactured by the method of the present invention is used as a water treatment agent, the said solution achieves a good coagulation performance. Although the reason why the basic ferric sulfate solution manufactured by the method of the present invention exhibits a significant coagulation performance is not clear, the followings will be presumed to be the causes therefor. Thus, since the iron ore which is an iron material used in the present invention rarely contains ferrous iron, its polymerization mode will be different from that of a product which is polymerized by an oxidizing process proposed in the prior art; iron ore which is available in nature becomes a mineral or shows a change in its structure after a very long period; and the existing site, form, type and amount of the impurities therein show some influences on the polymerization.

Incidentally, the basic ferric sulfate solution of the present invention is that in which a molar ratio of $SO_4$ to Fe is from 1.25 to less than 1.5. Thus, when the ratio is lower than the lower limit, stability of the solution becomes bad and the water treating property becomes significantly poor while, when it is higher than the upper limit, the water treating property of the present invention cannot be expected. With regard to the total iron concentration, it is to be 10% by weight or more as Fe and, in addition, the amount of divalent iron ($Fe^{2+}$) is to be 0.1 or less. When the total iron concentration (as Fe) is lower than 10% by weight, a water treatment agent having a high coagulation performance is not available. Although there is no particular limitation for the upper limit of the concentration, it is usually 15% by weight or lower, in view of the stability of the solution. With regard to the method for the use of the water treatment agent of the present invention, it is just as same as that of the conventional water treatment agent such as aluminum sulfate, basic aluminum chloride and iron sulfate.

EXAMPLES

The present invention will now be further illustrated by way of the following examples. Unless otherwise mentioned, all of "%" used therein stands for "% by weight".

Example 1.

Iron ore (T—Fe=58%) (700 g) containing 46% of FeOOH as $Fe^{3+}$ was mixed with 45% sulfuric acid so as to make the molar ratio of $SO_4/Fe$ 1.08 and dissolved and reacted with boiling for 3 hours whereupon 66% of iron were leached. After cooling, 400 g of water were added and the mixture was filtered using a filter paper (No. 5C) to give a ferric sulfate solution. Its composition was $Fe^{2+}=0.05\%$, T—Fe= 12.3% and $SO_4=29.9\%$.

Example 2.

Iron ore (T—Fe=58%) (700 g) containing 46% of FeOOH as $Fe^{3+}$ was mixed with 45% sulfuric acid so as to make the molar ratio of $SO_4/Fe$ 1.30 and dissolved and reacted with boiling for 3 hours whereupon 74% of iron were leached. After cooling, 400 g of water were added and the mixture was filtered using a filter paper (No. 5C) to give a ferric sulfate solution. Its composition was $Fe^{2+}=0.04\%$, T—Fe= 11.5% and $SO_4=30.3\%$.

Example 3.

Iron ore (T—Fe=58%) (700 g) containing 46% of FeOOH as $Fe^{3+}$ was calcined at 400° C. for 1 hour. After cooling, it was mixed with 45% sulfuric acid so as to make the molar ratio of $SO_4/Fe$ 1.30 and the mixture was dissolved and reacted with boiling for 3 hours whereupon 86% of iron were leached. After cooling, 400 g of water were added and the mixture was filtered using a filter paper (No. 5C) to give a ferric sulfate solution. Its composition was $Fe^{2+}=0.03\%$, T—Fe=12.1% and $SO_4=29.6\%$.

Example 4.

Iron ore (T—Fe=58%) (700 g) containing 46% of FeOOH as $Fe^{3+}$ was calcined at 150° C. for 1 hour. After cooling, it was mixed with 45% sulfuric acid so as to make the molar ratio of $SO_4/Fe$ 1.30 and the mixture was dissolved and reacted with boiling for 3 hours whereupon 74% of iron were leached. After cooling, 400 g of water were added and the mixture was filtered using a filter paper (No. 5C) to give a ferric sulfate solution. Its composition was $Fe^{2+}=0.05\%$, T—Fe=11.5% and $SO_4=30.3\%$.

Example 5.

Iron ore (T—Fe=58%) (700 g) containing 46% of FeOOH as Fe was calcined at 700° C. for 1 hour. After cooling, it was mixed with 45% sulfuric acid so as to make the molar ratio of $SO_4/Fe$ 1.30 and the mixture was dissolved and reacted with boiling for 3 hours whereupon 45% of iron were leached. After cooling, 400 g of water were added and the mixture was filtered using a filter paper (No. 5C) to give a ferric sulfate solution. Its composition was $Fe^{2+}=0.02\%$, T—Fe=10.5% and $SO_4=34.4\%$.

Comparative Example 1.

Iron ore (700 g) containing 61% of $\alpha$-$Fe_2O_3$ as $Fe^{3+}$ was mixed with 45% sulfuric acid so as to make the molar ratio of $SO_4/Fe$ 1.08 and the mixture was dissolved and reacted with boiling for 3 hours whereupon 41% of iron were leached. After cooling, 400 g of water were added and the mixture was filtered using a filter paper (No. 5C) to give a ferric sulfate solution. Its composition was Fe=0.02%, T—Fe=10.2% and $SO_4=33.6\%$.

Comparative Example 2.

Iron ore (700 g) containing 57% of $Fe_3O_4$ as T—Fe was mixed with 45% sulfuric acid so as to make the molar ratio of $SO_4/Fe$ 0.86 and the mixture was dissolved and reacted with boiling for 3 hours whereupon 54% of iron were leached. After cooling, 400 g of water were added and the mixture was filtered using a filter paper (No. 5C) to give a ferric sulfate solution. Its composition was $Fe^{2+}=4.38\%$, T—Fe=11.0% and $SO_4=28.5\%$.

The above results are summarized and shown in Table 1.

TABLE 1

| | Molar Ratio of $SO_4/Fe$ upon Dissolving | Condition for Calcination | Rate of Leaching (%) | Analytical Data | | | Molar Ratio of $SO_4/Fe$ |
| --- | --- | --- | --- | --- | --- | --- | --- |
| | | | | $Fe^{2+}$ (%) | T-Fe (%) | $SO_4$ (%) | |
| Example 1 | 1.08 | — | 66 | 0.05 | 12.3 | 29.9 | 1.41 |
| Example 2 | 1.30 | — | 74 | 0.04 | 11.5 | 30.3 | 1.53 |
| Example 3 | 1.30 | 400° C./1 hour | 86 | 0.03 | 12.1 | 29.6 | 1.42 |
| Example 4 | 1.30 | 150° C./1 hour | 74 | 0.05 | 11.5 | 30.3 | 1.53 |
| Example 5 | 1.30 | 700° C./1 hour | 45 | 0.02 | 10.5 | 34.4 | 1.91 |
| Comparative Example 1 | 1.08 | — | 41 | 0.02 | 10.2 | 33.6 | 1.92 |
| Comparative Example 2 | 0.86 | — | 54 | 4.38 | 11.0 | 28.5 | 1.51 |

It is apparent from the above table that a product where $\alpha$-$Fe_2O_3$ is a main component is unable to be practically used because of a low iron leaching ratio and the presence of too much excessive free acid in the product. In the case of a product where $Fe_3O_4$ is a main component, large quantities of $Fe^{2+}$ are contained whereby an oxidizing treatment is necessary resulting in a high cost. With regard to the effect by calcination, iron leaching rate is improved at 200–600° C. as compared with the case where no calcination is carried out as shown in the table and, out of the said range, the effect is not achieved or iron leaching rate lowers. Thus, it is understood that, according to the present invention, iron leaching ratio is good and an iron sulfate solution can be easily manufactured.

Example 6.

Into a reactor equipped with a reflux condenser were poured 181 g of 45% sulfuric acid and 24 g of water and then, with stirring, 70 g of iron ore (containing 59% by weight of FeOOH as $Fe^{3+}$; average particle size: 250 μm or smaller) were gradually added thereto. The mixture was heated at 105° C. and dissolved by heating for 3 hours with stirring. After cooling, the solution was filtered to remove the undissolved iron ore whereupon a basic ferric sulfate solution was obtained. Its composition was $Fe^3+11.0\%$, $Fe^{2+}=0.04\%$, Al=0.1%, $SO_4=27.5\%$ and basicity=5.2%.

Comparative Example 3.

Ferrous sulfate heptahydrate (manufactured by Kanto Kagaku) (530 g) was mixed with 181 g of 45% sulfuric acid and 248 g of water and dissolved therein with stirring. To this were added 10 g of a 36% solution of $NaNO_2$ (a product of a reagent grade manufactured by Kanto Kagaku was dissolved in water to make the concentration of $NaNO_2$ 36%) and the mixture was oxidized with oxygen to give a basic ferric sulfate solution. Its composition was $Fe^{3+}=11.0\%$, Na=0.1%, $SO_4$ 27.1% and basicity =5.2%.

A jar test was carried out using the ferric sulfate solutions prepared in the above Examples and Comparative Examples. The results of the jar test are shown in Table 2 and Table 3.

In the test of Table 2, a model water was collected from the River Yodo and the turbidity was adjusted to 20 mg/L by adding kaolin (manufactured by Kanto Kagaku). The model water had pH of 7.8 and alkalinity of 27 mg/L.

In the test of Table 3, water from the River Kako (turbidity: 11 mg/L; pH: 8.0; alkalinity: 35 mg/L) was used as a model water. The stirring condition was that a rapid mixing of 120 rpm for 3 minutes, a slow mixing of 40 rpm for 10 minutes and the time for allowing to stand of 10 minutes. The experiment was carried out at room temperature.

A basic ferric sulfate solution used as a coagulant was added using a micropipette. Adjustment of the pH was carried out using 1/20 N HCl and 1/20 N NaOH.

Analysis of quality of water was carried out by collecting 100 ml of a supernatant liquid after allowing to stand for 10 minutes followed by measuring. Turbidity was measured using a Water Analyzer Type 2000 which was a turbidimeter manufactured by Nippon Denshoku Kogyo KK. pH was measured by the glass electrode method. To 1 L of the model water were added 1/20 N HCl and 1/20 N NaOH to adjust to a desired pH, then a coagulant was added thereto and pH and supernatant turbidity were measured under various conditions. Incidentally, the amount of the coagulant added thereto was Fe=3 ppm.

TABLE 2

|  | Supernatant Turbidity (mg/L) | Supernatant pH |
|---|---|---|
| Examples | 2.5 | 5.7 |
|  | 2.0 | 6.3 |
|  | 1.9 | 6.7 |
|  | 2.0 | 7.1 |
| Comparative | 3.9 | 5.5 |
| Examples | 2.8 | 6.2 |
|  | 2.7 | 6.9 |
|  | 2.8 | 7.2 |

TABLE 3

|  | Supernatant Turbidity (mg/L) | Supernatant pH |
|---|---|---|
| Examples | 0.7 | 6.0 |
|  | 0.6 | 6.5 |
|  | 0.6 | 6.7 |
|  | 1.0 | 7.3 |
| Comparative | 1.2 | 6.1 |
| Examples | 1.1 | 6.4 |
|  | 1.2 | 6.8 |
|  | 1.7 | 7.3 |

It is apparent from Table 2 and Table 3 that the water treatment agents consisting of the basic ferric sulfate solution manufactured by the method of the present invention showed a good coagulation performance.

Example 7.

A jar test was carried out using the basic ferric sulfate solution prepared in Example 6 and a liquid aluminum sulfate for water treatment (manufactured by Taki Kagaku; $Al_2O_3$: 8.1%; $SO_4$: 22.5%). The results of the jar test are shown in Table 4 and Table 5.

In the test of Table 4, water of the Lake Kasumigaura (turbidity: 19 mg/L; pH: 7.7; alkalinity: 45 mg/L) was used. Amount of the coagulant added was 40 ppm in terms of the original liquid. In the test of Table 5, water of the Lake Imbanuma (turbidity: 16 mg/L; pH: 9.2; alkalinity: 45 mg/L) was used. Amount of the coagulant added was 100 ppm in terms of the original liquid. The stirring condition was that a rapid mixing of 120 rpm for 3 minutes, a slow mixing of 40 rpm for 10 minutes and the time for allowing to stand of 10 minutes. The experiment was carried out at room temperature. A basic ferric sulfate solution and a liquid aluminum sulfate which were coagulants were added using a micropipette. Adjustment of pH was carried out using 1/20 N HCl and 1/20 N NaOH.

Analysis of quality of water was carried out by collecting 100 ml of a supernatant liquid after allowing to stand for 10 minutes followed by measuring. Turbidity was measured using a Water Analyzer Type 2000 which was a turbidimeter manufactured by Nippon Denshoku Kogyo KK. pH was measured by the glass electrode method. To 1 L of the model water were added 1/20 N HCl and 1/20 N NaOH to adjust to a desired pH, then a coagulant was added thereto and pH and supernatant turbidity were measured under various conditions.

TABLE 4

|  | Supernatant Turbidity (mg/L) | Supernatant pH |
|---|---|---|
| The Present | 0.9 | 6.2 |
| Invention | 1.1 | 6.5 |
|  | 1.0 | 6.8 |
|  | 1.0 | 7.5 |
| Liquid | 1.6 | 6.1 |
| Aluminum | 1.7 | 6.6 |
| Sulfate | 1.8 | 6.8 |
|  | 2.2 | 7.4 |

TABLE 5

|  | Supernatant Turbidity (mg/L) | Supernatant pH |
|---|---|---|
| The Present | 2.9 | 6.2 |
| Invention | 1.5 | 6.5 |
|  | 1.0 | 7.3 |
|  | 0.6 | 7.8 |
| Liquid | 3.4 | 6.3 |
| Aluminum | 2.3 | 6.6 |
| Sulfate | 2.1 | 7.2 |
|  | 1.0 | 7.5 |

It is apparent from Table 4 and Table 5 that the basic ferric sulfate solution manufactured by the method of the present invention showed a good coagulation performance.

ADVANTAGE OF THE INVENTION

In accordance with the method for the manufacture of a ferric sulfate solution of the present invention, a good effect that a ferric sulfate solution can be manufactured at a low cost and in an industrially easy manner is achieved.

Further, a water treatment agent consisting of a basic ferric sulfate solution manufactured by the said manufacturing method uses the material which is entirely different from that for the conventional basic ferric sulfate solution and can be manufactured at a very low cost and, in addition, it has good coagulation performance and dehydration performance.

What is claimed:

1. A method for the manufacture of a ferric sulfate solution, characterized in that, iron ore containing 30% by weight or more FeOOH as a trivalent iron ($Fe^{3+}$) is calcined at a temperature in the range of 200 to 600° C. and subsequently dissolved in sulfuric acid.

2. A water treatment agent consisting of a basic ferric sulfate solution manufactured by a manufacturing method mentioned in claim 1.